Figure 1:
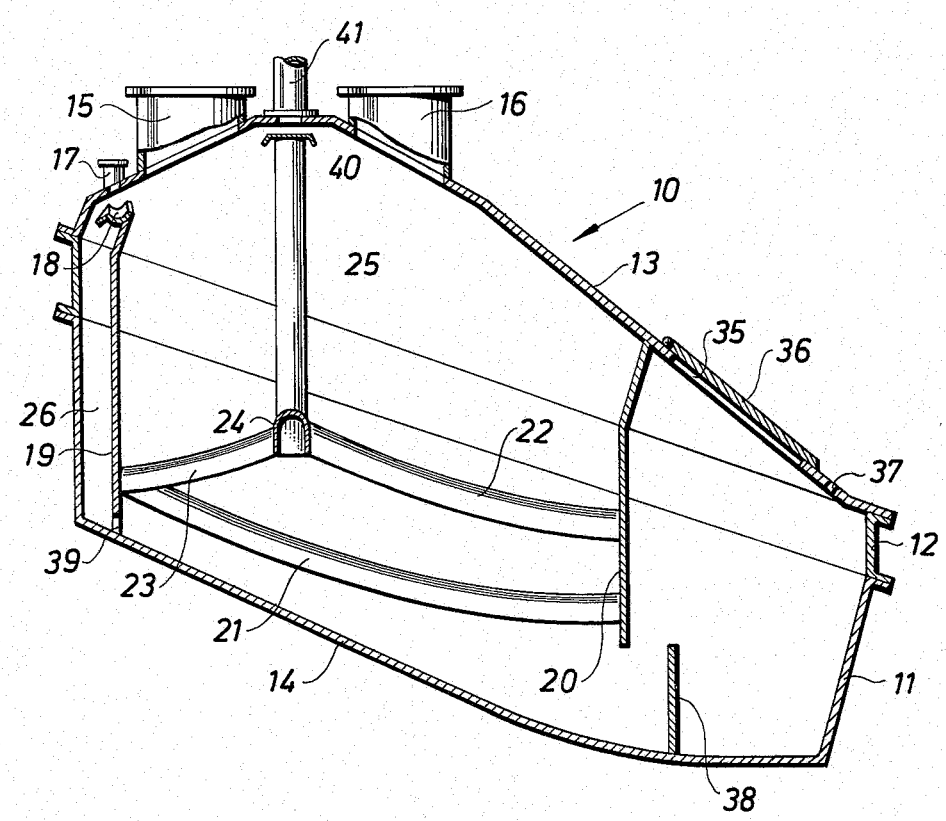

United States Patent [19]

Lindström

[11] 4,084,269
[45] Apr. 18, 1978

[54] ARRANGEMENT FOR MOULDERING ORGANIC WASTE MATERIAL

[76] Inventor: Rikard Emanuel Lindström, Tonstigen 6, 135 00 Tyreso, Sweden

[21] Appl. No.: 694,699

[22] Filed: Jun. 10, 1976

[30] Foreign Application Priority Data

Jun. 10, 1975 Sweden .............................. 7506661

[51] Int. Cl.² ......................... A47K 11/02; C05F 3/04
[52] U.S. Cl. ........................................ 4/111; 4/119; 4/DIG. 12; 23/259.1
[58] Field of Search ................. 4/9, 111, 116, 118, 4/119, 120, 131, 133, 138, 140, DIG. 12; 23/259.1; 71/9, 11, 12, 13

[56] References Cited

U.S. PATENT DOCUMENTS

| 725,050 | 4/1903 | Davis | 4/116 |
| 3,136,608 | 6/1964 | Lindstrom | 4/133 |
| 3,918,106 | 11/1975 | Hellquist | 4/DIG. 12 |
| 3,921,228 | 11/1975 | Sundberg | 4/DIG. 12 |
| 3,927,985 | 12/1975 | Hyttinge et al. | 4/DIG. 12 |

FOREIGN PATENT DOCUMENTS

858,612  12/1970  Canada .................................... 4/111

*Primary Examiner*—Richard E. Aegerter
*Assistant Examiner*—Richard R. Stearns
*Attorney, Agent, or Firm*—Fleit & Jacobson

[57] ABSTRACT

An arrangement for mouldering organic waste material is disclosed, comprising a container in which an inclined path is provided along which waste material supplied to the container may slide under the action of gravity while undergoing a mouldering process. Liquid conducting means are provided to conduct urine and other liquid, which is supplied to the container separated from other waste material, to a region within the container located adjacent to the highest portion of the inclined path.

5 Claims, 2 Drawing Figures

U.S. Patent  April 18, 1978  4,084,269

ARRANGEMENT FOR MOULDERING ORGANIC WASTE MATERIAL

The present invention relates to an arrangement for mouldering organic waste material. More particularly, the invention relates to such an arrangement of the kind comprising a container in which an inclined path is provided along which waste material supplied to the container may slide under the action of gravity while undergoing a mouldering process. The inclined path may suitably be formed by the bottom wall of the container.

An arrangement of said kind is previously known through U.S. Pat. No. 3,136,608. Said known arrangement, which has now been widely used for several years, has proved to function in a fully satisfactory manner. Since the closet chair connected to the arrangement is normally located straight above the container, a flushing water supply at the closet chair is not required. In order to enable an improved flexibility as regards the positioning of the closet chair with respect to the container, it has, however, been suggested to connect a closet chair to the container through the intermediary of an approximately horizontally extending worm conveyor. Similarly, as in the above-mentioned arrangement, no flushing water supply to the closet chair will be required to facilitate the necessary transportation of the waste material from the closet chair to the container. However, for hygienic reasons, it may be desired to provide the closet chair with means for cleaning it by flushing water upon each use of the chair. The amount of flushing water required for this purpose is only 0.1–0.2 liters. Thus, it is much smaller than the amount of several liters required at closet chairs, where the flushing water is used as a transporting agent for the waste material. Experiments with arrangements according to the above U.S. patent, to which one or more closet chairs have been connected by means of worm conveyors, have shown that the increased supply of liquid to the container does not need to cause any problems if the amount of flushing water is small. However, it must be expected that when a flushing water supply is provided it may happen in practice that the supplied quantity of water may sometimes be considerably larger than intended, for instance due to an unnecessarily large supply of water at each instance the chair is used or as a consequence of a repeated unnecessary flushing of the chair. Such a large increase of the total supply of liquid in comparison to the amount of more solid waste material supplied to the container may involve the risk that, if the liquid is permitted to flow freely down on the stack of waste material formed in the container, the liquid may at least partially pass comparatively quickly down to the lowest portion of the container and cause an accumulation of liquid at said portion. Additionally, the urine contained in the liquid would not have a chance to get biologically transformed in the desired manner and, consequently, it would not be possible to take advantage of the nitrogen content of the urine for promoting the desired transformation of the solid waste material.

An object of the invention is to provide an improved arrangement of the kind initially specified where the risk of disadvantages caused by a comparatively large supply of liquid is substantially decreased. For this purpose, the invention suggests that the arrangement should be provided with liquid conducting means arranged to conduct urine and other liquid, which is supplied to the container separated from other waste material, to a region within the container located adjacent to the highest portion of the inclined path.

The invention results in that the liquid will be fed to the layer of substantially mouldered waste material on the inclined path at the highest end of said path, whereby all liquid separately supplied to the container will be caused to pass longitudinally through said layer along the whole length thereof before it possibly may reach the lowest portion of the container. As the liquid will pass slowly through said layer, even comparatively large amounts of liquid may be evaporated or absorbed by the waste material disposed above said layer. Additionally, the liquid will become completely decomposed, thereby eliminating not only the risk for an accumulation of liquid at the lowest end of the container but also the risk that any urine may reach said portion of the container without having been previously decomposed.

The inclined path may preferably be formed by the bottom wall of the container. The liquid conducting means may then suitably include a substantially vertical shaft located above said region adjacent to the highest portion of the inclined path. Said shaft may be separated from the remaining portion of the container by means of a partition which prevents solid waste material from entering the shaft and blocking it. In order to facilitate a considerable evaporation of the liquid already during its passage through the shaft it may be advantageous to provide a suitable filling in the shaft, for instance in the shape of spherical balls of fired clay.

The invention may be utilized also in connection with arrangements where a flushing water supply is not provided and the closet chair or chairs are positioned straight above the container and connected thereto without the intermediary of any worm conveyor or other means for feeding the waste material laterally. In this case the closet chair may be provided with built-in means for separating urine from faeces.

The arrangement may suitably also be provided with means for distributing urine and any other liquid separately supplied over the whole width of the inclined path. Said liquid distributing means may consist of a screen located near the upper end of the vertical shaft and arranged to catch the supplied liquid and distribute it in a suitable manner within the shaft.

Figure 2:
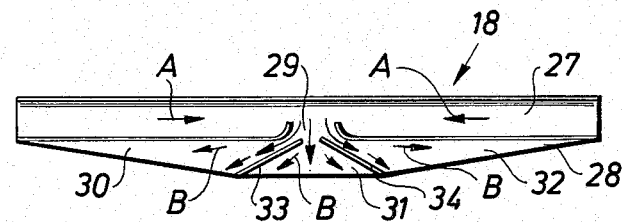

Below the invention will be described in further detail, reference being had to the accompanying drawing, in which:

FIG. 1 is a longitudinal sectional view of an arrangement according to one embodiment of the invention, while FIG. 2 is a plan view, on an enlarged scale, of a liquid distributing member of said arrangement.

The arrangement shown in the drawing comprises a container, generally designated 10, which is composed of three portions located one above the other. Thus, the container consists of a lower portion 11, an intermediate portion 12, and an upper portion 13. Reference numeral 14 designates the bottom wall of the container, which along the major portion of its length has an inclination in the order of 20°–30°. The upper portion of the container is provided with two upwardly extending pieces of pipe 15 and 16 of comparatively large diameter through which waste material may be fed into the container to become subjected to a mouldering process. Pipe piece 15 may be connected to one or more closet chairs, while pipe piece 16 may be connected to a garbage disposal. Reference numeral 17 designates a piece of pipe of smaller diameter which is arranged to receive liquid separately supplied to the container. Said liquid may consist of urine and any flushing water which has been separated from faeces and other more solid waste material, for instance by means of a worm conveyor extending in a slightly inclined direction. Pipe piece 17 is located above a liquid distributing member which will be described in greater detail below.

Two transversally extending partition walls 19 and 20 are provided in the container. Partition wall 19 is located at a comparatively short distance from the end wall of the container 10 which extends in an upward direction from the highest end of bottom wall 14. The other partition wall 20 is disposed at some distance from the opposite end wall of the container. Reference numerals 21, 22 and 23 designate channel profile members which are mounted in downwardly opening positions within the container to form air passages which serve to permit an aeration of the waste material in order to ensure an aerobic transformation of said material within the container. The channel profile members 21, 22 and 23 are mounted on the one hand in partition walls 19 and 20, and on the other hand in a transversally extending, downwardly opening collecting channel 24 which is connected to one or more upwardly extending pipes 25, the upper ends of which terminate at a short distance below the highest portion of the container. Said pipes 25 are fixed to a transverse member 40 which provides a free passage to an evacuation pipe 41 for air flowing in an upward direction through pipes 25 as well as for air flowing towards said portion of the container along the inner side of the upper portion 13.

The space provided between the upper end wall and partition wall 19 forms a vertical shaft or duct 26 through which urine and other liquid may pass to the region within the container located immediately above the highest portion of the bottom wall. The liquid distributing member 18, previously mentioned, is mounted at the upper end of shaft 26. In the illustrated embodiment, said member consists of a screen which is arranged to distribute the received liquid over the entire width of the container in order hereby to reduce the risk that the liquid may be concentrated to a single point at the bottom end of shaft 26.

The liquid distributing member has been shown in plan view in FIG. 2. It consists of a receiving portion 27 and a distributing portion 28. Portion 27 which has a generally semi-tubular shape has its longitudinally extending opening facing upwards. The two outer ends of portion 28 are disposed at a slightly higher level than the middle part of said portion. Hereby, liquid supplied to the container through a pipe 17 located at any point above the receiving portion 27 will flow in the directions of arrows A in FIG. 2 towards the middle part of said portion, where portion 28 is connected to portion 27 through an opening 29 in the wall of the latter. The distributing portion 28 has the shape of a plate formed by three parts 30, 31 and 32 which extend in slightly sloping directions towards the free edge of the plate and are separated from each other by ridges 33 and 34. As a consequence of this design of the distributing portion 28, liquid supplied from the receiving portion 27 through opening 29 will become distributed in the various directions of arrows B towards the free edge of distributing portion 28.

Reference numeral 35 designates an opening provided in the upper portion 13 of the container to permit withdrawal of completely mouldered material from the lowest portion of the container. A lid 36 is provided for normally covering opening 35. Reference numeral 37 designates apertures serving as air inlets. From said apertures air sucked into the container may pass to the venting channels 21 and 22 through openings provided in partition wall 20. Reference numeral 38 designates a low transversally extending wall which extends in an upward direction from the bottom 14 of the container to a level substantially corresponding to the level of the lower edge of partition wall 20. Wall 38 has for its purpose to make it easy, when taking the arrangement into use, to fill the space below wall 20 with earth or other suitable material that will prevent unmouldered waste material from entering into the lowest portion of the container during the first period of use of the arrangement. Later on wall 38 may be taken away. Alternatively, said wall may be made from a material that will moulder.

At its lower end, partition wall 19 has a series of openings 39 which serve to provide a liquid passage from shaft 26 to the layer of earth or mouldered waste material disposed on the bottom wall of the container.

For a detailed description of the mouldering process taking place within the container reference is called to U.S. Pat. No. 3,136,608.

The invention is not restricted to the embodiment above described and shown in the drawing. Thus, the detailed design of the arrangement may be varied in many ways within the scope of the invention. For instance, the supply of urine and any other liquid may take place through a passage located within pipe 15 instead of through the external pipe 17. Additionally, the liquid distributing member 18 may be replaced by any other suitable means, such as a perforated tube.

It is also possible to conduct the supplied liquid to the region adjacent the upper end of bottom wall 14 without utilizing a shaft formed by a special partition wall. However, the advantage of providing a shaft in the illustrated manner is that it may easily be filled with any suitable substance facilitating a substantial evaporation of the supplied liquid during its passage through said shaff.

What I claim is:

1. An arrangement for mouldering organic waste material in which liquids are supplied to a container separately from other waste, comprising a container having a waste supply opening located above an inclined surface provided at the bottom of the container along which waste material supplied to the container through said opening may slide under the action of gravity while undergoing a mouldering process, characterized by liquid conducting means arranged to conduct urine and other liquid, which is supplied to the container separated from other waste material, to a region within the container located adjacent to the highest portion of the inclined surface.

2. An arrangement according to claim 1, characterized in that the liquid conducting means include a substantially vertical duct located above said region.

3. An arrangement according to claim 2, characterized in that said liquid conducting means is provided with means for distributing the liquid over a substantial portion of the width of the inclined surface.

4. An arrangement according to claim 3, characterized in that said liquid distributing means are located near the upper end of said duct.

5. An arrangement according to claim 4, characterized in that said liquid distributing means include a trough arranged to catch the supplied liquid, said trough having channels therein to distribute the liquid within the duct.

* * * * *